W. REUTTER.
COLLAPSIBLE COVER OR HOOD FOR MOTOR AND LIKE VEHICLES.
APPLICATION FILED MAY 6, 1910.
1,003,656.
Patented Sept. 19, 1911.
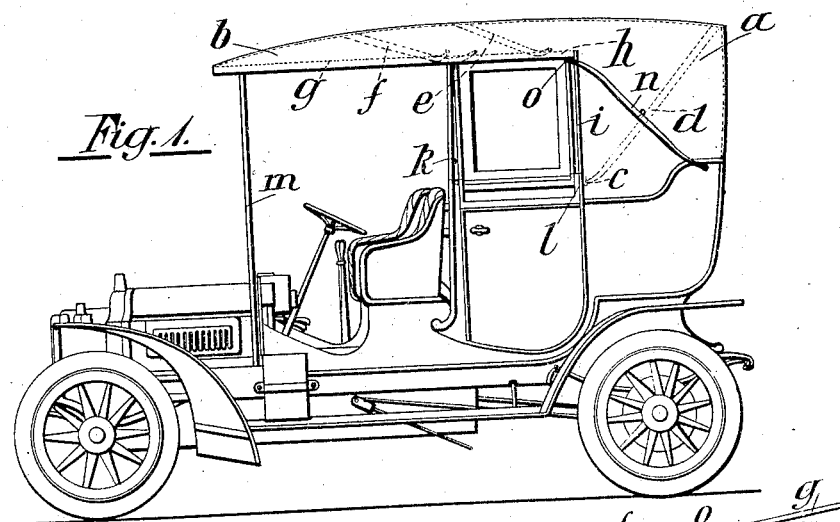
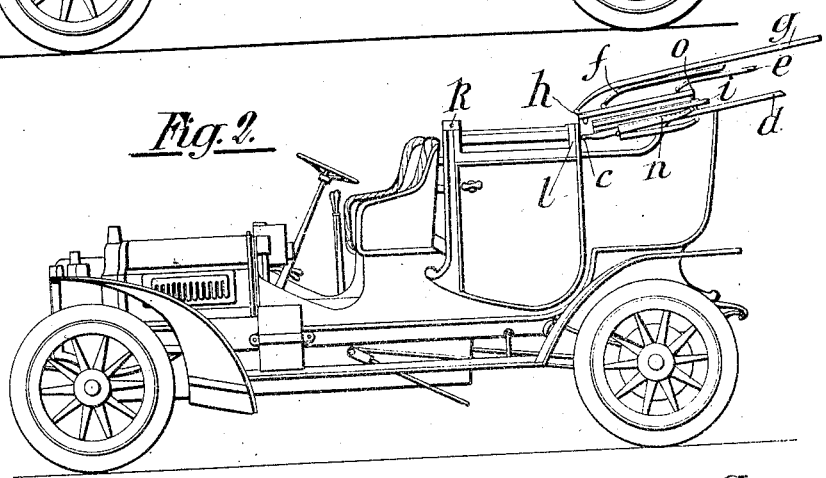
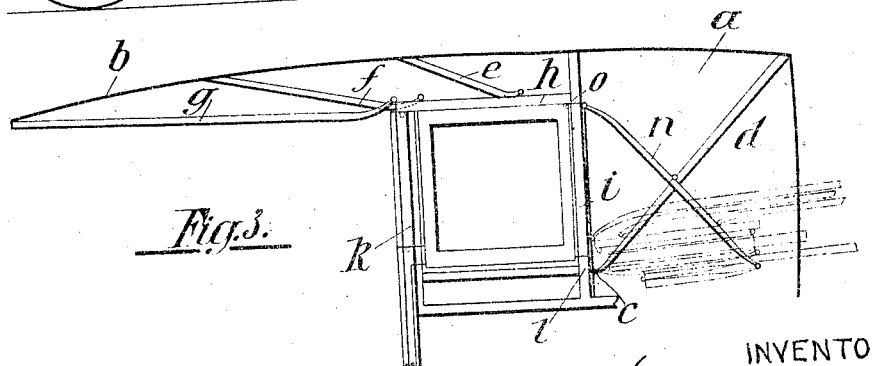
WITNESSES:
INVENTOR,
WILHELM REUTTER
by
Attorney.

UNITED STATES PATENT OFFICE.

WILHELM REUTTER, OF STUTTGART, GERMANY.

COLLAPSIBLE COVER OR HOOD FOR MOTOR AND LIKE VEHICLES.

1,003,656.

Specification of Letters Patent. Patented Sept. 19, 1911.

Application filed May 6, 1910. Serial No. 559,746.

*To all whom it may concern:*

Be it known that I, WILHELM REUTTER, a citizen of the German Empire, residing at Stuttgart, in the Kingdom of Wurttemberg, Empire of Germany, have invented certain new and useful Improvements in Collapsible Covers or Hoods for Motor and the Like Vehicles; and I do hereby declare the following to be a full, clear, and exact description of the invention, such as will enable others skilled in the art to which it appertains to make and use the same.

This invention has for its object a collapsible cover or hood for motor cars and the like, which is distinguished from similar known arrangements in addition to its light construction, particularly, by its being able to be collapsed together with the fore cover or hood from one point of rotation, the frame of the side windows being formed by the cover supports simultaneously with the erection of the cover. In this way it is possible for a landaulet, for instance, to be immediately converted into a phaeton by simply collapsing its cover.

One form of construction of the invention will now be more particularly explained in connection with the accompanying drawings as an example.

Figure 1 shows the improved arrangement in an erected position on a motor car; Fig. 2, the same in a collapsed condition; and Fig. 3, the same on an enlarged scale erected and in dotted lines collapsed.

The ordinary cover or hood $a$ forms in the present case one piece with the fore cover $b$, and the ordinary yoke-shaped struts or stays are flexibly connected with one another in such a way that they may be folded back simultaneously on a common point of rotation $c$. In order to allow of this the struts $d$ of the fore cover are directly pivoted at the point $c$, while the struts or stays $e$, $f$, $g$, are suitably pivoted to bars $h$, $i$. These bars $h$, $i$, which are in turn connected with one another by a hinge $o$, form, when the cover is erected, the upper and rear frame bars for the side windows, the upper bar $h$ resting on the folding posts $k$ of the front window, while the bar $i$ rests on the fixed posts $l$ of the door frame. The front cover $b$ is preferably supported in front also by folding struts $m$ or struts held taut by straps and the like. The front cover is stiffened by the ordinary braces $n$.

I declare that what I claim is:—

1. In a collapsible cover for automobiles, a frame, rear window bars pivoted thereto at their lower ends respectively, upper bars pivoted at their rear ends to the upper ends of the rear bars and adapted to fold downwardly against the front face of the rear bars, front stays pivoted to the front end of the upper bars and foldable backwardly toward the upper face of the upper bars, and intermediate stays pivoted to the upper face of the upper bars and foldable backwardly.

2. In an automobile or the like, the combination of a frame, rear window bars pivoted thereto at their lower ends, front folding window posts, upper bars pivoted to the upper ends of the rear window bars and adapted to rest at their front ends on the upper ends of the folding posts respectively, front stays pivoted to the forward ends of the upper bars respectively, intermediate stays pivoted to the intermediate part of the upper bars, struts pivoted substantially at the points at which the rear window-bars are pivoted, and a collapsible cover and hood carried by said stays cars and struts, said rear window bars and struts being adapted to fold backwardly so that the rear bars rest on the struts, the upper bars being foldable downwardly on the front part of the rear bars, and the stays being foldable backwardly on the upper bars.

In testimony whereof I affix my signature, in presence of two witnesses.

WILHELM REUTTER.

Witnesses:
HERMANN WIETHÜCHTER,
FRANZ GAUPP.